Jan. 21, 1958 S. O. BJORNBERG 2,820,386
APPARATUS FOR CUTTING HELICAL GROOVES
Filed July 1, 1954 2 Sheets-Sheet 1
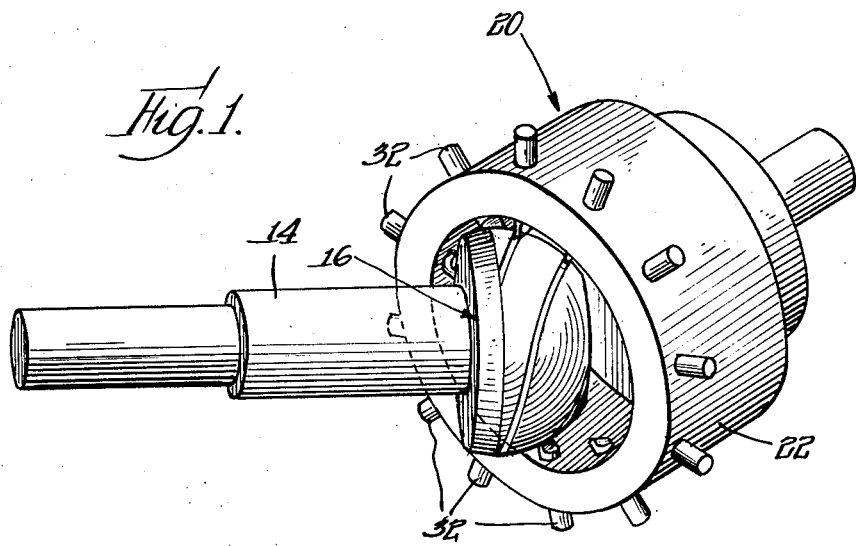
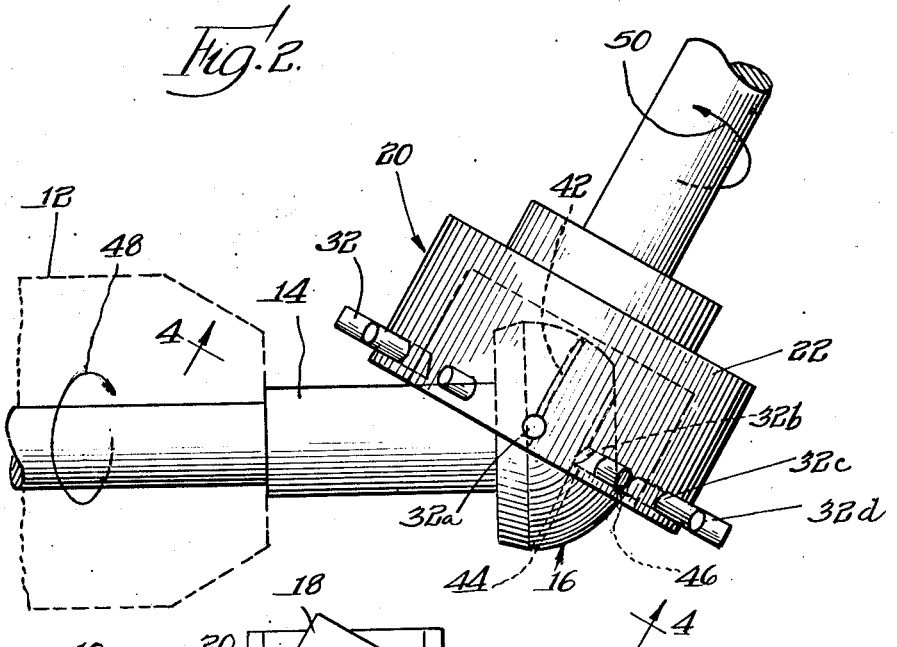
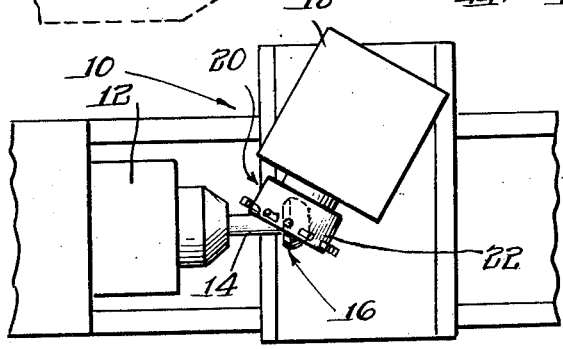
INVENTOR.
Swan O. Bjornberg
BY Olson & Trexler
attys

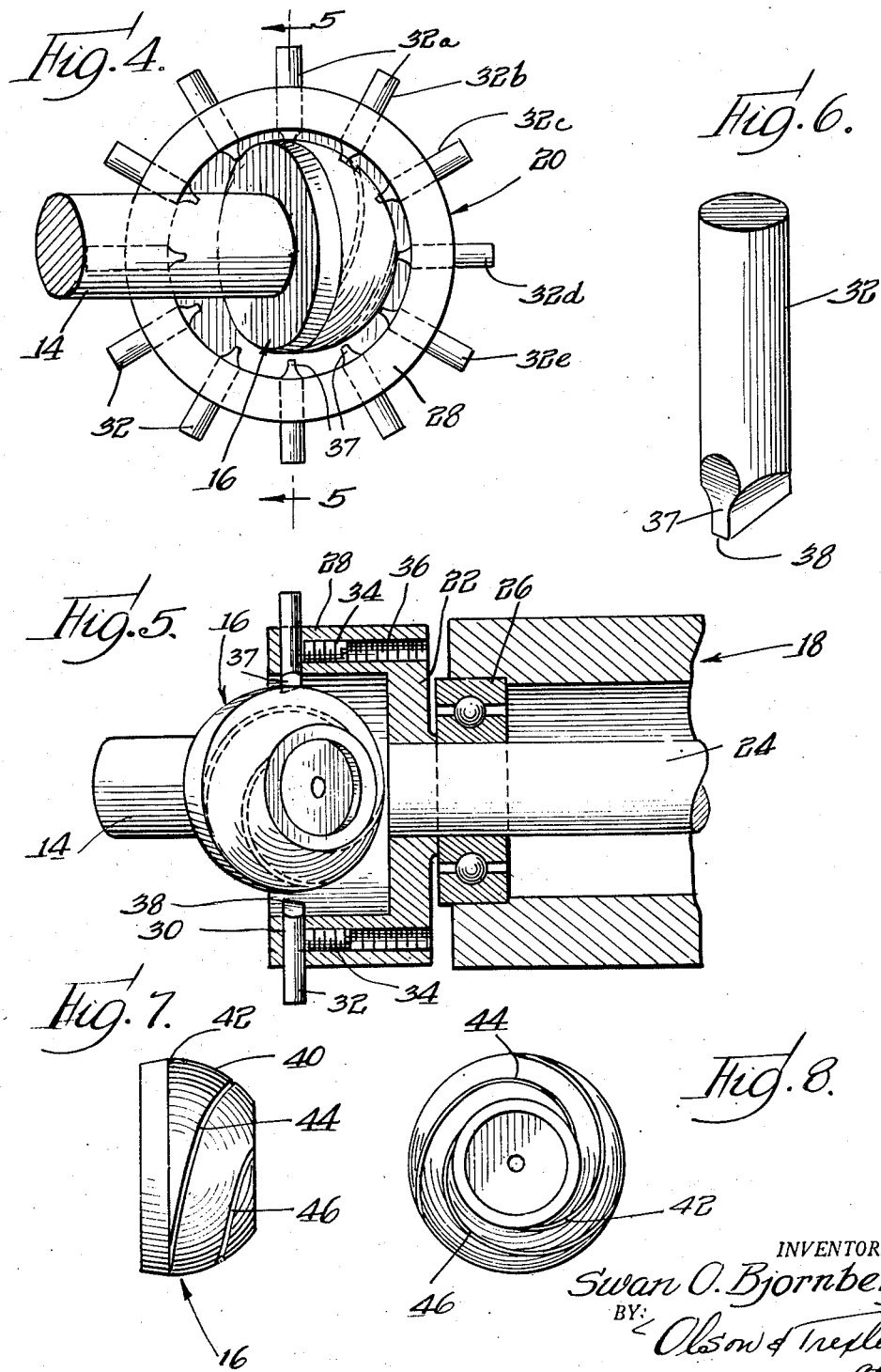

United States Patent Office 2,820,386
Patented Jan. 21, 1958

2,820,386

APPARATUS FOR CUTTING HELICAL GROOVES

Swan O. Bjornberg, Park Ridge, Ill., assignor to Illinois Tool Works, Chicago, Ill., a corporation of Illinois Application July 1, 1954, Serial No. 440,616

3 Claims. (Cl. 82—20)

The present invention relates to a novel apparatus for forming grooves in workpieces and more particularly, to a novel apparatus for forming spiral grooves in a spherical surface of a workpiece.

While the present invention may be utilized for forming various workpieces, the invention will be described with particular reference to processing or forming bearing members used in ball joint suspensions of the type found in automobiles. Such bearing members are formed with a surface portion comprising a segment of a sphere, and helical oil directing grooves are formed in the spherical surface portion. Before the present invention, these helical grooves were rolled or pressed into the spherical surface. This method of forming the grooves is relatively slow and uneconomical and in addition, this method causes severe internal stresses to be set up within the bearing so that when the bearing is subsequently heat-treated and hardened, it may warp out of shape and become useless. It is, therefore, a primary object of the present invention to provide a novel method and apparatus whereby helical grooves may be formed in a spherical surface in a rapid and economical manner and without setting up undue internal stresses in the workpiece.

Another object of the present invention is to provide a novel apparatus for cutting helical grooves in a spherical surface in a manner so that it is unnecessary to provide complicated means for feeding the cutting tool and workpiece relative to each other.

A further object of the present invention is to provide a novel cutting tool which may be used to form one or more helical grooves in a spherical workpiece and which is constructed so that a plurality of grooves may be simultaneously formed.

Other objects and advantages of the present invention will become apparent from the following description and the accompanying drawings wherein:

Fig. 1 is a perspective view showing a novel cutting tool embodying the principles of this invention and a workpiece disposed so that the cutting tool may form a plurality of helical grooves in the workpiece;

Fig. 2 is a fragmentary plan view of the apparatus of this invention;

Fig. 3 is a somewhat diagrammatic plan view of an apparatus embodying the principles of this invention;

Fig. 4 is a fragmentary cross sectional view taken along line 4—4 in Fig. 2;

Fig. 5 is a fragmentary cross sectional view taken along line 5—5 in Fig. 4;

Fig. 6 is an enlarged perspective view of one of the cutting elements used in the tool of this invention;

Fig. 7 is a side view of a workpiece or bearing which may be formed by the apparatus of this invention; and Fig. 8 is an end view of the workpiece shown in Fig. 7.

Referring now more specifically to the drawings wherein like parts are designated by the same numerals throughout the various figures, an apparatus 10 embodying the principles of this invention is somewhat diagrammatically shown in Fig. 3. This apparatus includes a headstock 12 of any known form capable of rotatably supporting and driving a mandrel 14 carrying a workpiece 16, a fixture 18 of any desired structure capable of rotatably supporting and driving a tool 20, and suitable drive means, not shown, which may include gears or chains and the like and which is capable of operatively interconnecting the drive mechanism of the headstock and fixture so that the workpiece and tool 20 are both positively driven in predetermined timed relationship.

The novel cutting tool 20 of this invention includes a body 22 fixed on a shank 24, which shank is adapted to be connected to the drive of the fixture 18 and anti-friction or roller bearing unit 26 is mounted on the shank adjacent the body 22 and is cooperable with the fixture for rotatably supporting the shank.

The body 22 is provided with an axially extending annular flange portion 28 within which the workpiece may project in the manner shown in the drawings. The annular flange 28 is provided with a plurality of radially extending and circumferentially spaced apertures 30, each of which apertures receives a cutting element 32. The cutting elements are respectively retained in the desired position by means of said screws 34 threaded into apertures 36 formed in the flange 28. As shown best in Figs. 4, 5 and 6, each of the cutting elements projects radially inwardly of the flange 28 and is provided with a tip portion having a face 37 and a cutting edge 38. The cutting elements are arranged so that their cutting edges define a circle disposed in a plane perpendicular to the rotative axis of the body 22 and having a diameter slightly larger than the diameter of the workpiece or bearing member 16 and so that their faces 37 are facing substantially axially of the axis of said circle, or, in other words, the planes of the faces 37 and the cutting edges 38 are disposed substantially in the plane of said circle.

The finished workpiece or bearing member 16 includes a surface 40 which is in the form of a segment of a sphere and which is provided with helically and spirally arranged grooves 42, 44 and 46. While the workpiece is illustrated as being provided with three grooves, it will be understood that it may be provided with a different number of grooves and the tool 20 may be adapted to form such a modified workpiece having a different number of grooves merely by changing the number of equally spaced cutting elements carried by the flange 28.

As shown best in Fig. 2, the tool 20 and the workpiece 16 are supported for rotation about angularly disposed or skew axes. It should be noted that the tool is arranged so that the cutting elements 32 rotate about a circle disposed in a plane, which plane is inclined to the axis of the workpiece at an angle substantially equal to the lead angle of the helical grooves to be formed in the workpiece. The body member 22 and the workpiece are partially telescopically arranged so that the plane of the cutting element end edges 38 intersects another plane perpendicular to the rotative axis of the workpiece and including the greatest diameter of the workpiece along a line which intersects and is perpendicular to the skew axes of the workpiece and the body member 22. Furthermore, as shown best in Figs. 4 and 5, the axis of rotation of the workpiece is radially offset from the axis of rotation of the tool sufficiently so that the spherical surface 40 of the workpiece intersects a portion of the circle defined by the cutting end edges 38 and is disposed for simultaneous contact with three of the cutting elements, which cutting elements are designated as 32a, 32b and 32c.

In accordance with the method of the present invention, the helical grooves are formed in the workpiece by arranging the workpiece and cutting tool 20 with respect to each other in the manner described above and energizing the drive means of the apparatus 10 so that the workpiece and cutting tool are both positively driven in the direction indicated by the arrows 48 and 50. In addition, in the particular embodiment illustrated, the drive meas is such that the ratio of the number of rotations of the workpiece to the number of rotations of the cutting tool is 4 to 1.

With the workpiece and cutting tool in the position shown in Fig. 2 and rotating in the direction of the arrows 48 and 50, it is seen that the cutting element 32a is finishing the end of the groove 42, the element 32b is cutting an intermediate portion of the groove 44 and the element 32c is starting the groove 46. As the workpiece and tool rotate at a 4 to 1 ratio as mentioned above, the elements 32b and 32c will continue cutting their respective grooves and the next cutting element designated as 32d will start cutting the forward end of the groove 42. Upon further rotation, the element 32d will cut the remainder of the groove 42 missed by the element 32a and the following cutting element designated as 32e will start cutting the lead end of the groove 44 and cut the remainder of the groove missed by the cutting element 32b. Upon still further rotation the remaining cutting elements will pass through and finish cutting the previously formed grooves. Since the cutting tool 20 includes twelve equally spaced cutting elements and since the workpiece and cutting tool rotate at a 4 to 1 ratio, it is seen that for each rotation of the cutting tool, four of the cutting elements which are spaced at 90° intervals will cut or pass through each groove so that each of the grooves will be properly finished regardless of the fact that the first cuts of at least two of the grooves will necessarily be at a point between the ends of these grooves. With the cutting tool and the workpiece angularly disposed in the manner described and rotating in predetermined timed relationship, the helical grooves will automatically be formed with the proper lead angle. Thus, the apparatus does not require any complicated means for feeding the workpiece relative to the tool in order to helically form the grooves.

From the above description, it is seen that the present invention has provided a novel method and apparatus whereby helical grooves may be formed in a spherical surface in a rapid and economical manner. More specifically, it is seen that the present invention has provided a novel tool which may be disposed and operated simultaneously to cut a plurality of helical grooves in the spherical surface of the workpiece. It will be appreciated that the novel cutting tool of this invention may be used in combination with various lathes, screw machines or other similar machines which permit the cutting tool and workpiece to be angularly disposed in the manner described above and positively driven in timed relationship with each other.

While the preferred embodiment of the present invention has been shown and described herein, it is obvious that many structural details may be changed without departing from the spirit and scope of the appended claims.

The present invention is claimed as follows:

1. An apparatus for forming a plurality of spaced helical grooves having a predetermined lead angle in a substantially spherical surface of a workpiece comprising a rotatable member, a plurality of groove forming elements spaced circumferentially around said rotatable member, the spacing being equal to the desired spacing of the helical grooves, said elements extending substantially radially of said rotatable member and including free end cutting edges tangent to and disposed in a common plane with a circle concentric with said rotatable member, means supporting said rotatable member, means for supporting a workpiece for rotation, the axes of rotation of said rotatable member and the workpiece being disposed at an angle with respect to each other substantially equal to said predetermined lead angle and with the plane of said circle including a line perpendicular to said axes and with a spherical surface of the workpiece intersecting a portion of said circle, the number of said forming elements being such that a plurality of said elements engage said workpiece along said intersection so that upon rotation of said rotatable member and said workpiece a plurality of said edges will simultaneously cut the spherical surface and said cutting edges as a whole will be successively fed into contact with the spherical surface of the workpiece, and means for rotating said rotatable member and said workpiece at such differential speeds to effectuate the length and the helix of the groove desired.

2. An apparatus, as defined in claim 1, wherein said rotatable member includes an annular portion into which the workpiece may be partially inserted, said groove forming elements being spaced around and extending radially inwardly from said annular portion.

3. An apparatus, as defined in claim 2, wherein said annular portion includes a plurality of circumferentially spaced radially extending aperture means respectively receiving said groove forming elements, and locking means threaded into said annular portion and engaging said elements for securing said elements within said aperture means.

References Cited in the file of this patent

UNITED STATES PATENTS

| | | |
|---|---|---|
| 530,167 | Draper | Dec. 4, 1894 |
| 577,332 | Tangye | Feb. 16, 1897 |
| 1,507,235 | Hall | Sept. 2, 1924 |
| 1,859,006 | Schaad | May 17, 1932 |
| 1,879,196 | Greene | Sept. 27, 1932 |
| 2,121,934 | Snader | June 28, 1938 |
| 2,378,963 | Watson | June 26, 1945 |
| 2,545,931 | Samsky | Mar. 20, 1951 |
| 2,651,832 | Menard | Sept. 15, 1953 |
| 2,691,921 | Burgsmuller | Oct. 19, 1954 |